(12) United States Patent
Lin

(10) Patent No.: US 6,505,738 B2
(45) Date of Patent: Jan. 14, 2003

(54) CD PACKAGE

(75) Inventor: David Lin, Taipei (TW)

(73) Assignee: Ulead Systems, Inc., Taipei (TW)

( * ) Notice: Subject to any disclaimer, the term of this patent is extended or adjusted under 35 U.S.C. 154(b) by 0 days.

(21) Appl. No.: 09/818,740

(22) Filed: Mar. 27, 2001

(65) Prior Publication Data

US 2002/0112975 A1 Aug. 22, 2002

(30) Foreign Application Priority Data

Feb. 20, 2001 (TW) ....................... 90202503 U

(51) Int. Cl.$^7$ .............................................. B65D 85/57
(52) U.S. Cl. ................... 206/308.1; 206/459.5; 40/748; 40/754
(58) Field of Search ............... 206/308.1, 309–313, 206/459.5, 767; 40/748, 750, 754, 756, 755

(56) References Cited

U.S. PATENT DOCUMENTS

| | | | | | |
|---|---|---|---|---|---|
| 1,421,097 | A | * | 6/1922 | Pente | 40/754 |
| 5,772,022 | A | * | 6/1998 | Renna | 206/312 |
| 5,823,333 | A | * | 10/1998 | Mori | 206/308.1 |
| 6,179,119 | B1 | * | 1/2001 | Manoogian | 206/308.1 |

* cited by examiner

Primary Examiner—Shian Luong
(74) Attorney, Agent, or Firm—Birch, Stewart, Kolasch & Birch, LLP

(57) ABSTRACT

A CD package comprising a case with an indentation, formed with fold lines and cut lines to fold out a brace and a hitch, whereby bracing the case, or hanging the case. The CD package can be reused to be a photo frame.

15 Claims, 4 Drawing Sheets

CD PACKAGE

BACKGROUND OF THE INVENTION

1. Field of the Invention

The present invention relates to a CD package, particularly relates to a CD package that can be reused as a photo frame.

2. Description of the Related Arts

Packages are mainly provided to protect, and decorate the productions contained. For CD products (including CD, VCD, DVD, CD ROM, and so on), Beside CD cases, the products would be covered with exquisite CD packages, which are usually printed with introductions about the contents.

CD packages are usually expendables, dropped after purchases of CDs. However, the sold number of a single batch of CDs is never the less tens of thousands, and the quantity of dropped CD packages per year is so huge that resulting in a serious problem of resource consuming. On the other hand, if the CD packages are reusable for other purpose, e.g. photo frames, the problem will be alleviated, and the supplementary value of products will be simultaneously increased.

SUMMARY OF THE INVENTION

According to the first aspect of the present invention, there is a CD package, adapted to contain a CD case, the CD package comprising: a main board, comprising a first surface, a second surface, two first edge substantially paralleled, and a second edge substantially perpendicular to the first edge; two attaching boards, each comprising: a third edge; and a first free edge parallel to the third edge; three first fold lines forming on the attaching boards, by which dividing the attaching board, from the third edge to the first free edge, into a first sub-board, a second sub-board, a third sub-board, and a fourth sub-board, wherein the first and third edges are joined to form a second fold line, where for folding the first, second and third sub-boards toward the first surface along a first direction according to the first and second fold lines, folding the fourth sub-board along a second direction contrary to the first direction according to the first fold line, and disposing the fourth board onto the first surface, whereby substantially forming two squares constructed by each of the attaching boards and the main board, wherein partial of the third and fourth sub-boards are defined to be an indent area, where for folding an indentation for inserting the CD case.

The CD package further comprises and a front board, comprising: a first aperture; a fourth edge; a second free edge parallel to the fourth edge; three third fold lines forming on the front board, paralleled to the fourth edge, wherein the fourth edge and the second edge are joined to form a fourth fold line, where for folding the front board toward the first surface according to the third and fourth fold lines, and disposing the second free edge onto the second surface, whereby forming a case by covering the squares with the front board, wherein the first aperture exposes the indentations.

The main board further formed with a fifth fold line and a first contour line, wherein the first contour line is formed with two ends substantially connected the fifth fold line, where for cutting the main board along the first contour line, and folding the main board according to the fifth fold line to form a brace extending from the second surface, whereby bracing the case.

The main board, the attaching boards, and the front board are integrally made. The attaching boards is further formed along the periphery of the indent area with two first cut lines that perpendicular to the third edge, where for cutting the attaching board along the first cut lines and folding the indent area to form the indentation.

The main board further forms a second aperture by folding out the brace, and the front board further comprises an insert board attaching to the second free edge in accordance to the second aperture, where for fastening the front board to the main board by inserting the insert board into the second aperture.

The main board further comprises a sixth fold line intersecting the fifth fold line and a second contour line, wherein the second contour line is formed with two ends substantially connected the sixth fold line, where for cutting the main board along the second contour line, and folding the main board according to the sixth fold line to form a sub-brace extending from the second surface, whereby fastening the brace.

The sub-brace is provided with an insert slot, where for clipping the brace and fastening the brace.

The main board is further formed with a seventh fold line, a third contour line connecting the seventh fold line by two ends, and a through hole formed on the area surrounded by the seventh fold line and the third contour line, where for cutting the main board along the third contour and folding the main board according to the seventh fold line to form a hitch board comprising the through hole.

The seventh fold line is joined to the second fold line or the fourth fold line. There is further a transparent board, attaching on the front board and covering the first aperture, wherein the transparent board is made by a material selected from the group consisting of plastic, acrylic, cellophane, and glass.

The main board, the attaching boards, and the front board are made by a material selected from the group consisting of pasteboard and corrugated paper.

According to the second aspect of the present invention, there is a CD package, adapted to contain a CD case, the CD package comprising: a case, forming an indentation on a first surface thereof, where for containing the CD case, wherein the a case is further formed with a fold line and a cut line on a second surface thereof, where for case along the cut line, and folding outward cut area according to the fold line, whereby forming a brace that bracing the case; and a front board, covering the first surface of the case, wherein the front board further comprising an aperture exposing the indentation of the case.

There is further a transparent board, attaching on the front board and covering the first aperture, wherein the transparent board is made by a material selected from the group consisting of plastic, acrylic, cellophane, and glass.

The case and the front board are made by a material selected from the group consisting of pasteboard and corrugated paper.

According to the third aspect of the resent invention, there is a CD package, adapted to contain a CD case, the CD package comprising: a case, forming an indentation on a first surface thereof, where for containing the CD case, wherein the a case is further formed with a fold line, a cut line connecting the fold line by two ends, and a through hole formed on the area surrounded by the fold line and the cut line, where for cutting the main board along the cut line and folding the main board according to the fold line to form a hitch board comprising the through hole; and a front board, covering the first surface of the case, wherein the front board further comprising an aperture exposing the indentation of the case.

There is further a transparent board, attaching on the front board and covering the first aperture, wherein the transparent board is made by a material selected from the group consisting of plastic, acrylic, cellophane, and glass.

The case and the front board are made by a material selected from the group consisting of pasteboard and corrugated paper.

BRIEF DESCRIPTION OF THE DRAWINGS

The present invention can be fully understood from the following detailed description and preferred embodiment with reference to the accompanying drawings in which.

DETAIL DESCRIPTION OF THE EMBODIMENT

Figure 1:
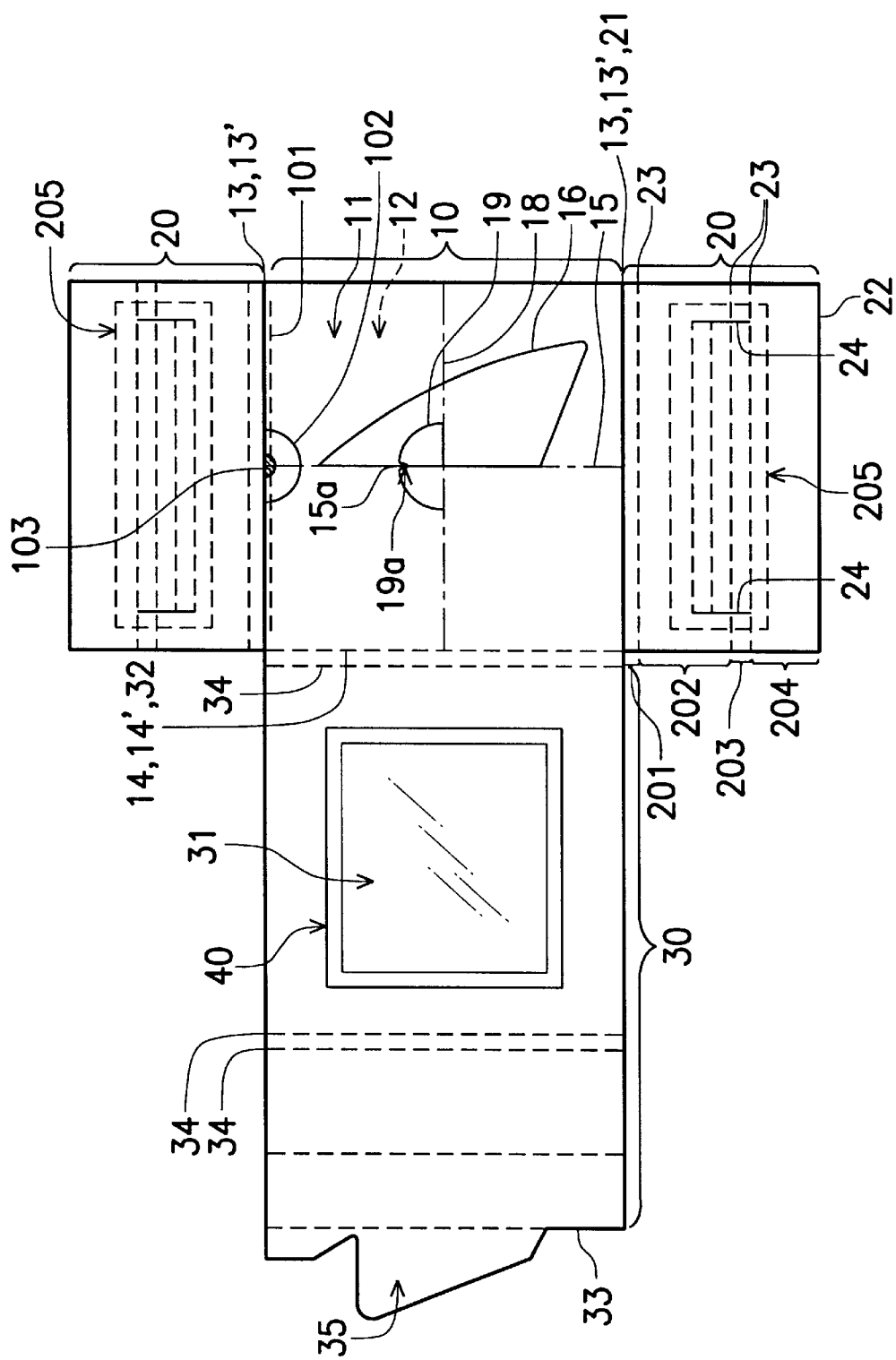
FIG. 1 shows a unfolded view of a CD package according to the embodiment of the present invention.

As shown in FIG. 1, the embodiment of the present invention is a CD package 100, wherein FIG. 1 shows the unfolded view thereof. The CD package 100 comprises a square main board 10, the main board 10 comprises a first surface 11, a second surface 12, two first edges 13 that parallel to each other, and a second edge 14 perpendicular to the first edges.

Two attaching boards 20 are attached to the both opposite ends of the main board 10, each the attaching board 20 is comprised of a third edge 21, a first free edge 22 parallel to the third edge 21, and three first fold lines 23 formed parallel to the third edge. The fold lines divide the attaching board 20, from the third edge 21 to the first free edge 22, into a first sub-board 201, a second sub-board 202, a third sub-board 203, and a fourth sub-board 204. The third edge 21 is attached to the first edge 13, thereby forming a second fold line 13'.

Figure 2:
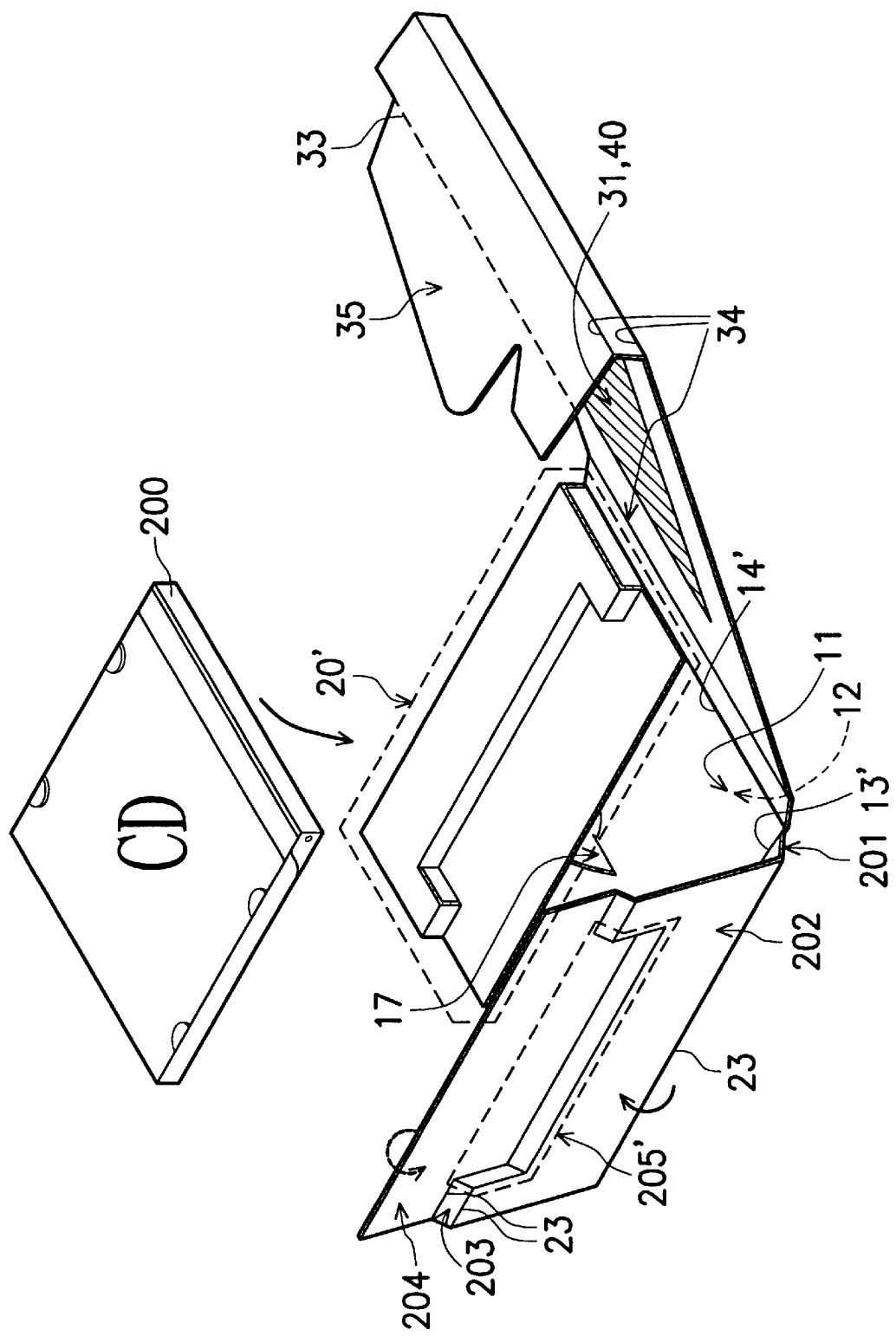
FIGS. 2 and 3 shows the folding of the CD package according to the embodiment of present invention.

In FIG. 2, the first, second, and third sub-boards 201~203 are folded toward the first surface 11 along a first direction (indicated by the thick arrow) according to the first and second fold lines 23, 13'. Simultaneously, the fourth board 204 is folded along a second direction (indicated by the dotted arrow) contrary to the first direction according to the first fold lines 23. The fourth board 204 is then attached to the first surface 11, and then the folded attaching board 20 and the main board 10 forms a square 20'.

Partial of the adjacent third sub-board 203 and fourth sub-board 204 are defined to be an indent area 205, the indent area is used to form an indentation 205', which containing the CD case 200.

Back to FIG. 1, the CD package 100 further comprises a front board 30. The front board 30 is formed with a first aperture 31, and comprises a fourth edge 32 and a second free edge 33 that parallel to each other. There are further three third fold lines 34 forming on the front board 30, wherein the third fold lines 34 are parallel to the fourth edge 32. The fourth edge 32 is attached to the second edge 14, and forms a fourth fold line 14'.

Figure 3:
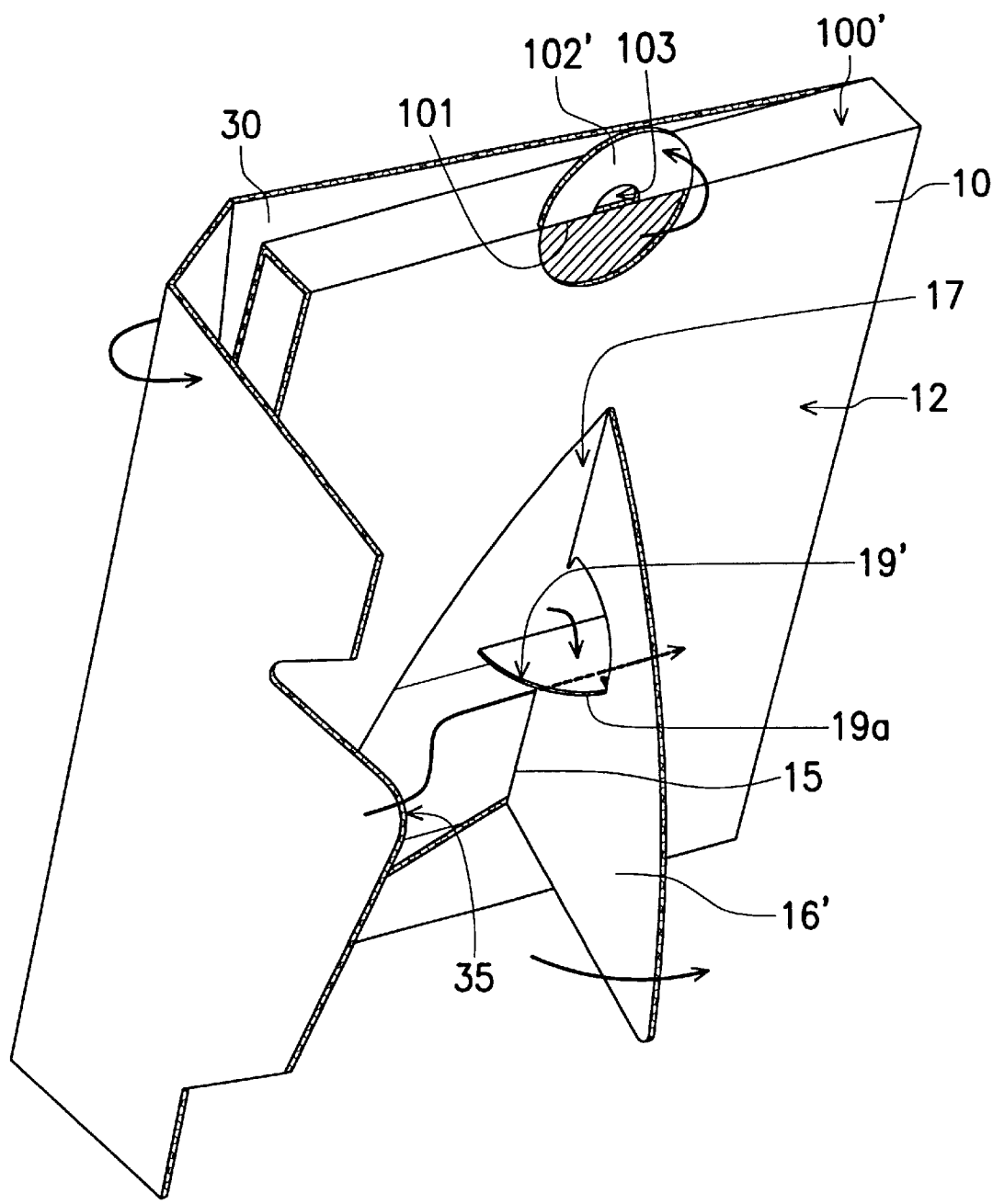
Figure 4:
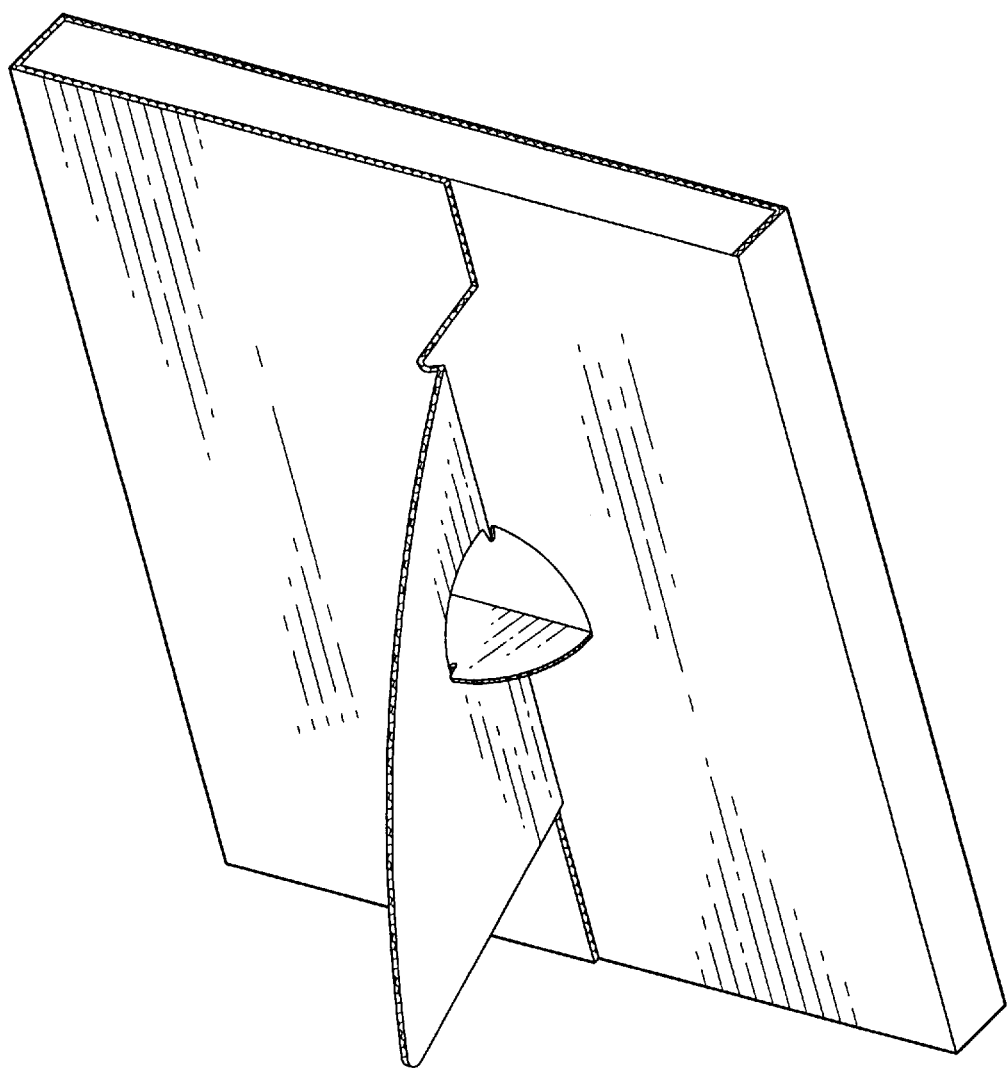
FIG. 4 shows a finish view of the CD package according to the embodiment of the present invention.

In FIG. 2, the front board 30 is folded toward the first surface 11 according to the third fold lines 34 and the fourth fold line 14', and then the second free edge 33 is disposed to the second surface 12 (as shown in FIG. 3), thereby covering the squares 20' formed by the two attaching boards 20 with the front board 30, and forming a case 100' as shown in FIG. 4. Wherein, the first aperture 31 is formed in accordance to the indentation 205', whereby exposing the indentation 205'.

The main board is further formed with a fifth fold line 15 and a first contour line 16. Two ends of the first contour line 16 are connected to the fifth fold line 15. As shown in FIG. 3, the main board 10 is cut along the first contour line 16, and the cut portion is folded out according to the fifth fold line 15, and then a brace 16 is formed. The brace 16 is used to brace the case; thereby the case can stand on a plane.

Preferably, the main board 10, attaching boards 20, and the front board 30 are made integrally, and the material is preferably pasteboard or corrugated paper.

In FIGS. 1 and 2, on periphery of the indent area 205, the attaching board is preferably formed with two first cut lines 24 perpendicular to the third edge 21. Wherein, the attaching board 20 is cut along the first cut lines 24, and then the indent area 205 is folded to form an indentation 205', as shown in FIG. 2.

As shown in FIG. 2, after folding out the brace 16', there is a second aperture 17 appeared on the main board 10. As shown in FIG. 1 and 2, preferably, there is an insert board 35 attaching to the second free edge 33 of the front board 30, in accordance to the second aperture 17. In folding, as shown in FIG. 3, the insert board 35 can be inserted in the second aperture 17 to fasten the whole structure.

Preferably, as shown in FIGS. 1 and 3, the main board 10 is formed with a sixth fold line 18 intersecting the fifth fold line 15, and a second contour line 19 that connecting the fifth fold line 15 by two ends thereof. The main board 10 is cut along the second contour line 19, and the cut area is folded outward the second surface 12 according to the sixth fold line 18, whereby forming a sub-brace 19' that fastening the brace 16'.

Preferably, as shown in FIGS. 1 and 3, the second contour 19 intersects the fifth fold line 15 at an intersection 15a. At the intersection 15a, the second contour line 19 is formed with a projection 19a toward the sixth fold line 18. The projection 19a becomes an insert slot 19a' after the sub-brace 19' is formed, thereby the brace 16' can be fasten by inserting into the insert slot 19a'.

Furthermore, the CD package 100 of the present invention can be provided with a hitch means. As shown in FIG. 1, the main board 10 is preferably formed with a seventh fold line 101 and a third contour line 102. The third contour 102 connects the seventh fold line by two ends. There is further a through hole 103 formed on the area surrounded by the third contour line 102 and the seventh fold line 101. As shown in FIG. 3, the main board is cut along the third contour 102, and the cut area is folded outward from the second surface 12 according to the seventh fold line 101. And then, a hitch board 102' comprising the through hole 103 is formed.

The seventh fold line 101 can be joined to the second fold line 13' or the fourth fold line 14'.

Additionally, there is preferably a transparent board 40, whereby attaching on the front board 30 and covering the first aperture 31. The transparent board 40 is preferably made from plastic, acrylic, cellophane or glass.

FIG. 4 shows a finish view of the CD package 100.

The CD package according to the present invention is reusable. It can be used as a photo frame or painting frame.

Additionally, the CD-package-frame is adapted to be placed on a plane or suspended on the wall. According to the present invention, the supplementary value of products will be effectively increased.

While the invention has been described with reference to a preferred embodiment, the description is not intended to be construed in a limiting sense. It is therefore contemplated that the appended claims will cover any such modifications or embodiments as may fall within the scope of the invention defined by the following claims and their equivalents.

What is claimed is:

1. A CD package, adapted to contain a CD case, the CD package comprising:
   a main board, comprising a first surface, a second surface, two first edges substantially paralleled, and a second edge substantially perpendicular to the first edges; two attaching boards, each comprising:
   a third edge; and
   a first free edge parallel to the third edge;
   three first fold lines formed on the attaching boards, by which dividing the attaching board, from the third edge to the first free edge, into a first sub-board, a second sub-board, a third sub-board, and a fourth sub-board, wherein the first and third edges are joined to form a second fold line, where for folding the first, second and third sub-boards toward the first surface along a first direction according to the first fold line and the second fold line, folding the fourth sub-board along a second direction contrary to the first direction according to the first fold line, and disposing the fourth board onto the first surface, whereby substantially forming two squares constructed by each of the attaching boards and the main board, wherein partial of the third and fourth sub-boards are defined to be an indent area, where for folding an indentation for inserting the CD case;
   a front board, comprising:
   a first aperture;
   a fourth edge;
   a second free edge parallel to the fourth edge;
   three third fold lines forming on the front board, paralleled to the fourth edge, wherein the fourth edge and the second edge are joined to form a fourth fold line, where for folding the front board toward the first surface according to the third and fourth fold lines, and disposing the second free edge onto the second surface, whereby forming a case by covering the squares with the front board, wherein the first aperture exposes the indentations; and
   the main board further formed with a fifth fold line and a first contour line, wherein the first contour line is formed with two ends substantially connected the fifth fold line, where for cutting the main board along the first contour line, and folding the main board according to the fifth fold line to form a brace extending from the second surface, whereby supporting the case.

2. The CD package of claim 1, wherein the main board, the attaching boards, and the front board are integrally made.

3. The CD package of claim 2, wherein each the attaching boards is further formed along the periphery of the indent area with two first cut lines that perpendicular to the third edge, where for cutting the attaching board along the first cut lines and folding the indent area to form the indentation.

4. The CD package of claim 3, wherein the main board further forms a second aperture by folding out the brace, and the front board further comprises an insert board attaching to the second free edge in accordance to the second aperture, where for fastening the front board to the main board by inserting the insert board into the second aperture.

5. The CD package of claim 4, wherein the main board further comprises a sixth fold line intersecting the fifth fold line and a second contour line, wherein the second contour line is formed with two ends substantially connected the sixth fold line, where for cutting the main board along the second contour line, and folding the main board according to the sixth fold line to form a sub-brace extending from the second surface, whereby fastening the brace.

6. The CD package of claim 5, wherein the sub-brace is provided with an insert slot, where for clipping the brace and fastening the brace.

7. The CD package of claim 6, wherein the main board is further formed with a seventh fold line, a third contour line connecting the seventh fold line by two ends, and a through hole formed on the area surrounded by the seventh fold line and the third contour line, where for cutting the main board along the third contour and folding the main board according to the seventh fold line to form a hitch board comprising the through hole.

8. The CD package of claim 7, wherein the seventh fold line is joined to the second fold line.

9. The CD package of claim 6, further comprising a transparent sheet, attaching on the front board and covering the first aperture.

10. The CD package of claim 9, wherein the transparent board is made by a material selected from the group consisting of plastic, acrylic, cellophane, and glass.

11. The CD package of claim 6, wherein the main board, the attaching boards, and the front board are made by a material selected from the group consisting of pasteboard and corrugated paper.

12. A CD package, adapted to contain a CD case, the CD package comprising:
   a case, forming an indentation on a first surface thereof, where for containing the CD case, wherein the a case is further formed with a fold line, a cut line connecting the fold line by two ends, and a through hole formed on the area surrounded by the fold line and the cut line, where for cutting the main board along the cut line and folding the main board according to the fold line to form a hitch board comprising the through hole; and
   a front board, covering the first surface of the case, wherein the front board further comprising an aperture exposing the indentation of the case.

13. The CD package of claim 12, further comprising a transparent board, attaching on the front board and covering the first aperture.

14. The CD package of claim 13, wherein the transparent board is made by a material selected from the group consisting of plastic, acrylic, cellophane, and glass.

15. The CD package of claim 13, wherein the case and the front board are made by a material selected from the group consisting of pasteboard and corrugated paper.

* * * * *